United States Patent
Goodzeit

[11] Patent Number: 5,984,237
[45] Date of Patent: Nov. 16, 1999

[54] DELTA-V TARGETING SYSTEM FOR THREE-AXIS CONTROLLED SPACECRAFT

[75] Inventor: Neil Evan Goodzeit, Princeton, N.J.

[73] Assignee: Lockheed Martin Corp., Sunnyvale, Calif.

[21] Appl. No.: 08/800,720

[22] Filed: Feb. 13, 1997

[51] Int. Cl.$^6$ ..................................................... B64G 1/21
[52] U.S. Cl. ........................................... 244/169; 701/13
[58] Field of Search ................................... 244/164, 165, 244/170, 169, 171; 701/13

[56] References Cited

U.S. PATENT DOCUMENTS

| | | | |
|---|---|---|---|
| 4,927,101 | 5/1990 | Blancke | 244/170 |
| 5,058,835 | 10/1991 | Goodzeit et al. | 244/165 |
| 5,400,252 | 3/1995 | Kazimi et al. | 244/169 |
| 5,646,847 | 7/1997 | Rafan et al. | 244/169 |

Primary Examiner—Galen L. Barefoot
Attorney, Agent, or Firm—W. H. Meise; R. P. Kennedy

[57] ABSTRACT

A three-axis stabilized spacecraft is subject to a velocity change in a desired direction by a thruster. Unavoidable alignment errors cause a body torque, which tends to slew the body away from the attitude which orients the thrust axis in the direction. The attitude control system eventually corrects the attitude, but the thrust during the attitude transient results in an error in the direction of the velocity change. This error in the direction accumulates during the attitude transient. When the attitude transient passes, no further pointing error occurs. A control system, operating without an accelerometer, determines the total error accumulated during the attitude transient, and processes the error signal to generate a supplemental torque demand signal, which is added to the torque demand signal produced by the attitude control system, to cause an oppositely-directed attitude transient to thereby cancel the original velocity change direction error.

7 Claims, 4 Drawing Sheets

DELTA-V TARGETING SYSTEM FOR THREE-AXIS CONTROLLED SPACECRAFT

FIELD OF THE INVENTION

This invention relates to spacecraft attitude control, and more particularly to spacecraft attitude control during operation of a velocity-change thruster.

BACKGROUND OF THE INVENTION

Spacecraft are often launched on a booster which places the spacecraft in an orbit which is lower than the desired orbit. In order for a spacecraft to achieve the desired orbit, it may be necessary to operate a velocity change (delta-V or $\Delta V$) thruster mounted on the spacecraft body.

When spin-stabilized spacecraft are accelerated by a velocity change thruster such as a liquid apogee thruster (LAE), the spinning spacecraft body provides gyroscopic stiffness which tends to reduce deviations of the longitudinal axis of the body from the desired pointing direction. In this context, the pointing direction is the direction in which the velocity change is desired. Three-axis stabilized spacecraft, however, do not rely on spin stabilization, and are stabilized by the operation of an attitude control system, which uses controllable torquers to rotate the body about the three axes of control. These axes are normally designated as the yaw, roll, and pitch axes.

When a spacecraft is fabricated, a great deal of attention is paid to aligning the thrust axes of the various thrusters relative to the center of mass of the spacecraft in a manner which results, when each thruster is fired, in the desired torque. In the case of attitude control thrusters, the desired torques are those around the three principal axes. In the case of the velocity change thruster, the desired torque is zero around each of the three body axes. That is, the velocity change thruster desirably imparts only a velocity change in the direction of its axis of thrust, and ideally does not impart a torque to the spacecraft body. In order to minimize the torques which the velocity change thruster imparts to the spacecraft body, its thrust axis is aligned as closely as possible with the center of mass of the spacecraft body.

In reality, it is not possible to determine the exact location of the center of mass of the spacecraft body, or to align the thrust axis of the velocity change thruster therewith. It is also difficult to determine the exact axis of thrust of the thruster. Consequently, operation of the velocity change thruster always results in some unwanted torques, which tend to rotate the spacecraft away from the desired pointing direction.

The attitude of a three-axis stabilized spacecraft is controlled by its attitude control system, as by operating momentum or reaction wheels, by magnetic torquing, or by operating attitude control thrusters. The disturbance torques occasioned by operation of the velocity change thruster are opposed by the torques produced by the attitude control system. However, due to the finite bandwidth of the attitude control system, there is some delay between the torque occasioned by the velocity change thruster and the opposing correction torque produced by the attitude control system. This delay results in a pointing error, which exists or continues until the attitude control system applies control to fully counteract the disturbance and realign the spacecraft with the desired pointing directions. During the interval between initiation of operation of the velocity S change thruster and the stabilization of the attitude control system, a component of velocity change occurs in an unwanted direction, which is not corrected by the attitude control system.

Improved spacecraft control systems are desired.

SUMMARY OF THE INVENTION

In general, a spacecraft according to the invention determines the instantaneous thrust direction during operation of a velocity change ($\Delta V$) thruster. The thrust direction is determined in an inertial coordinate frame that does not rotate with the spacecraft body. This thrust direction is compared to the desired thrust direction in an inertial coordinate frame, and the instantaneous thrust direction pointing error is generated. This error is integrated to get a cumulative error which is used to generate a velocity change torque demand signal. The velocity change torque demand signal is summed with the attitude torque demand signal to form a summed torque demand signal for operating the thrusters of the attitude control system, with the result that the velocity change in an undesired direction, which occurs during the transient attitude error, is in effect replicated in the opposite direction, so that the velocity change in the unwanted direction is cancelled by another similar velocity change in the opposite direction.

More particularly, a method for operating a spacecraft defining a center of mass in accordance with the invention includes the step of continuously operating the spacecraft in a three-axis stabilized mode. Operation in the three-axis stabilized mode is accomplished by determining the attitude of the spacecraft, and comparing the attitude of the spacecraft with a desired attitude, to thereby generate attitude and attitude rate error signals. The attitude and rate error signals are operated on with a proportional-integral-derivative characteristic, to thereby form a first torque demand signal for aiding in attitude control, to tend to maintain the desired attitude. A desired velocity-change direction in an inertial coordinate frame is selected. The spacecraft is oriented so that the nominal thrust axis of a velocity change thruster is aligned with the desired velocity-change direction. A velocity change thruster is operated for a period of time in order to achieve the desired nominal magnitude of velocity change in the desired direction. Unavoidable misalignments between the nominal thrust axis and the center of mass cause an undesired residual torque, which tends to cause the direction of the velocity change imparted by the thruster to progressively diverge from the desired velocity-change direction, until such time at which the operation of the attitude control returns the attitude of the spacecraft to its nominal attitude. As a result of the transient attitude error before the attitude control returns the attitude to the desired attitude, a component of the velocity change occurs in a direction other than the desired direction.

The direction of the instantaneous thrust which results from operation of the velocity change thruster is determined in an inertial coordinate frame which does not rotate with the spacecraft. The actual thrust direction is compared with the desired thrust direction, to produce a second error signal representative of the error between the desired thrust direction and the actual thrust direction. A second torque demand signal is generated from the integral of the second error signal. During the operation of the velocity-6 change thruster, the first and second torque demand signals are summed to form a summed torque demand signal for controlling the attitude control thrusters.

A spacecraft according to the invention includes an attitude sensing arrangement for sensing the attitude of the spacecraft body in space, and for generating attitude-representative signals in response thereto. An attitude control arrangement is coupled to the attitude sensing arrangement, for comparing the attitude-representative signals with signals representing a desired attitude, and for generating at least attitude error signals from the comparison. A loop control processing arrangement is coupled to the attitude control arrangement, for processing the attitude error signals with at least one of a proportional, integral, and derivative transfer characteristic, as required for loop stability, to thereby generate first torque demand signals. A velocity-change thruster is oriented with its nominal thrust axis aligned with the nominal center of mass of the spacecraft, to reduce unwanted torques. Operation of the velocity-change thruster tends to accelerate the spacecraft in the direction of the nominal thrust axis, but unavoidable misalignments between the nominal thrust axis and the center of mass of the spacecraft tend to cause residual torque. The unwanted residual torque causes the actual direction of the velocity change to deviate from the desired velocity change direction. A thrust direction determining arrangement determines the actual direction of the thrust vector when the velocity-change thruster is energized, and generates actual thrust vector direction representative signals. A velocity-change targeting control arrangement is coupled to the thrust direction determining arrangement, for comparing the actual direction of the thrust with the desired direction of the thrust, to form a second error, which is used for generating second torque demand signals. An attitude control thruster arrangement is coupled to the body of the spacecraft, for generating attitude control torques in response to sum torque demand signals. A summing arrangement is coupled to the loop control arrangement and to the velocity-change targeting control arrangement, for summing the first and second torque demand signals to produce sum torque demand signals representative of the sum of the first and second torque demand signals. In a particular embodiment of the invention, the summing arrangement sums the first and second torque demand signals only during those intervals in which the velocity-change thruster is energized. The loop control processing arrangement may include a PID processor.

Note that the invention assumes that the acceleration or the magnitude of the velocity change is invariant over the relevant interval, and that this technique does not require knowledge of the actual magnitude of the delta-V, so the arrangement according to the invention does not require an accelerometer for this purpose.

DESCRIPTION OF THE INVENTION

Figure 1A:
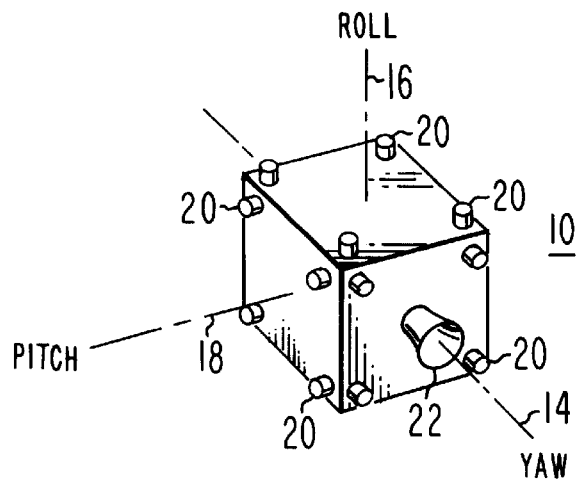
FIG. 1a is a simplified illustration of a spacecraft which includes a control arrangement according to the invention.

In FIG. 1a, a spacecraft 10 includes a body 12 which is stabilized about yaw, roll and pitch 14, 16, and 18, respectively. Spacecraft 10 includes a plurality of torquers, illustrated as thrusters, some of which are designated 20. Those skilled in the art will realize that momentum or reaction wheels (not illustrated), or magnetic torquers (not illustrated), may be used in place of, or in conjunction with, the thrusters 20, as conditions may require or allow. As illustrated in FIGURE 1a, spacecraft 10 includes a velocity change thruster in the form of a liquid-propellant apogee (LAE) engine 22. Velocity change thruster 22 generally has thrust which is of greater magnitude than that of the attitude control thrusters 20.

Figure 1B:
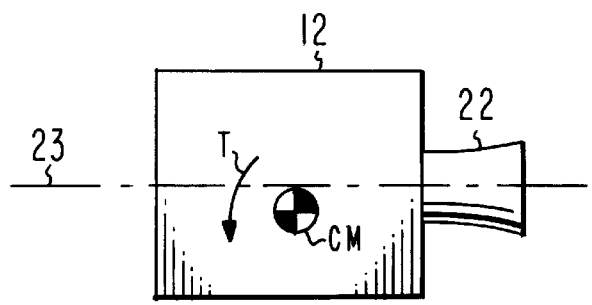
FIG. 1b illustrates how the desired orientation of the thrust axis of the velocity change thruster may not coincide with the center of mass of the spacecraft.

FIG. 1b is a side view of the spacecraft 10 of FIG. 1a, showing the actual thrust axis 23 of thruster 22, and also illustrating the center of mass (CM). The center of mass does not coincide with, or lie on, the axis 23 of thrust. As a consequence, operation of the velocity change thruster 22 results in an undesired torque in the direction of arrow T, which in turn tends to rotate the spacecraft during acceleration.

When the spacecraft 10 of FIG. 1 is placed in a low earth or transfer orbit, the solar panels (not illustrated) are folded against the body, but at least one panel will ordinarily be available to convert sunlight into electrical energy. The spacecraft cannot have the solar panel facing the sun at all times, because of the danger of overheating, but it must at least occasionally face the sun, to provide power for the spacecraft systems. Consequently, the spacecraft is rotated slowly, to allow the solar panel to be sequentially illuminated and in shadow. The rotation of the spacecraft results in lack of coincidence between axes in inertial space and body-centered axes.

Figure 2:
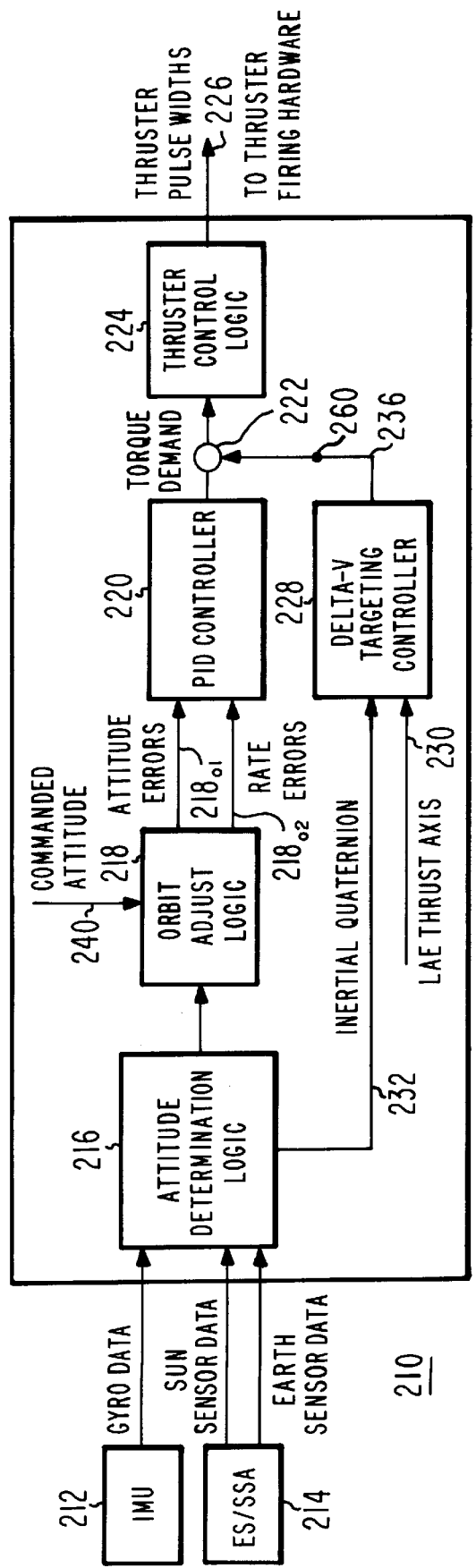
FIG. 2 is a simplified block diagram of a controller according to an aspect of the invention, which may be used in the spacecraft of FIG. 1.

FIG. 2 is an overall block diagram of an attitude controller 210 according to an aspect of the invention. In FIG. 2, an inertial measurement unit (IMU) 212 generates attitude rate data, and an ES/SSA (a combined sun sensor and earth horizon sensor) produces sun sensor and earth sensor data, all of which are coupled to an Attitude Determination Logic arrangement illustrated as a block 216. Block 216 converts information from the sensors from the body frame to inertial coordinates in order to allow determination of the spacecraft inertial attitude. The information from Attitude Determination Logic block 216 is applied to Orbit Adjustment Logic illustrated as a further block 218, which also receives information over a path 240 relating to the desired or commanded spacecraft attitude. Logic block 218 calculates attitude errors and attitude rate errors. The attitude error and attitude error rate information are applied by way of signal paths $218_{o1}$ and $218_{o2}$, respectively, to a further processor illustrated as a proportional-integral-derivative (PID) controller 220, which processes the error signals with a transfer characteristic selected to stabilize the attitude control loop, in known fashion. Those skilled in the art will recognize that the magnitudes of the various components or elements of controller 220 will depend upon the characteristics of the overall system, and that the magnitude of a particular component may be zero. The output of PID controller 220 is in the form of torque demand signals, which are applied by way of a noninverting input port of a summer 222 to a thruster control logic arrangement illustrated as a block 224. Thruster control logic block 224 energizes selected ones of the attitude control thrusters 20, and modulates their on-times, as necessary, to provide the torque impulses represented by the torque demand signals. The thruster control signals are applied over a data bus 226 to the various thrusters 20 of FIG. 1. An attitude control system such as that so far described in conjunction with FIG. 3 tends to maintain the spacecraft body in an orientation specified by the commanded attitude applied over path 240. In the absence of attitude errors, the body 12 of spacecraft 10 will be aligned by the attitude control system so that the nominal thrust axis of the delta-V thruster is pointed exactly in the direction of the desired velocity change.

Figure 3A:
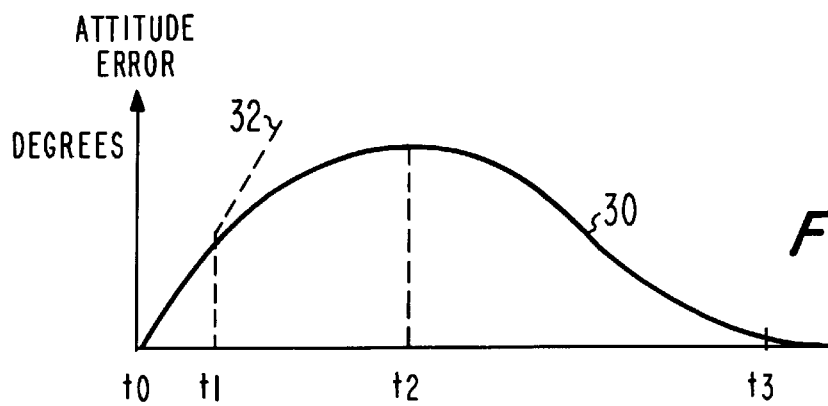
FIG. 3a is a simplified amplitude-time plot of angular deviation of the pointing direction of a spacecraft having an attitude control system operating during operation of a velocity change ($\Delta V$) thruster.

Those skilled in the art know that attitude control loops such as that so far described in conjunction with FIG. 2 have a bandwidth which is limited by at least the stability requirements described in conjunction with PID controller 220. FIG. 3a illustrates an amplitude-time plot 30 of the attitude error occasioned by operation of velocity change thruster 22 in the presence of an attitude control loop such as that portion of FIG. 2 as so far described. The velocity change thruster is energized at time t0, the undesired torque appears immediately, and begins to slew the spacecraft attitude in the same direction as the torque, which means that an attitude rate is immediately generated, which is represented in FIG. 3a by the dash-line initial slope 32 of plot 30. At time t1, the attitude control system begins to correct the attitude, but the attitude error continues to grow until a later time t2. The correction applied by the attitude control system of the spacecraft continues to grow in the time after time t2, and the attitude error is eventually nulled near or after a time t3. However, during the entire attitude transient interval extending from time t0 to t3, the direction in which the spacecraft is "pointed," or in which the thruster 22 is accelerating the spacecraft, deviates from the desired direction of acceleration. That is to say that, during the period t0–t3, the spacecraft is pointed in the "wrong" direction, and the velocity change thruster accelerates the spacecraft in this wrong direction. In general, the attitude error will be only a few degrees, so most of the acceleration or velocity change is in the desired direction, but the overall velocity change contains an unwanted component in a direction which is orthogonal to the desired direction. This velocity change error is related to the integral of the product of the instantaneous attitude error represented by plot 30, multiplied by the instantaneous acceleration. Note that if the spacecraft is rotating about the delta-V thruster thrust axis, this integration must be carried out in an inertial coordinate frame which does not rotate with body 12 of spacecraft 10. The integrated attitude error alone is not exactly proportional to the velocity change because the thrust of the thruster may change from time to time, an even if the thrust is invariant, the mass of the spacecraft is decreasing as propellant is consumed. Assuming, however, that the acceleration is constant (thrust and mass are constant) during the interval t0–t3 of the attitude transient, the velocity change error is proportional to the time integral of curve 30 of FIG. 3a. Thus, the longer the duration of the transient (the slower the attitude control loop), the greater the velocity change error, and the greater the magnitude of the transient (the lower the gain of the attitude control loop), the greater the velocity change error.

Figure 3B:
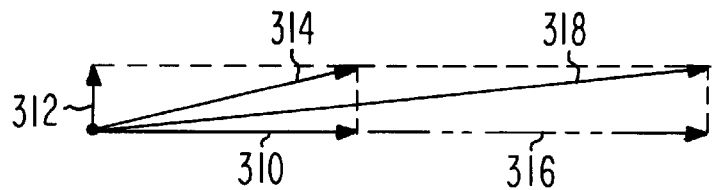
FIG. 3b is a vector diagram illustrating how the velocity change vector approaches the desired velocity change vector as the duration of the thrust interval increases.

It should be noted that after the period of the transient attitude error, the pointing of the spacecraft is essentially correct (plot 30 of FIG. 3a coincides with the abscissa of the coordinate system), so additional velocity change direction error does not accumulate. Consequently, if the period of operation of the velocity change thruster (the period of the thruster operation after time t3 of the transient) increases, the component of velocity change in the desired direction should also increase, with the result that the more-or-less constant magnitude of the velocity change error attributable to the attitude transient illustrated in FIG. 3a results in reduction in the velocity change error. In other words, as that portion of the velocity change in the desired direction becomes longer, a fixed-dimension velocity change error becomes proportionally smaller. FIG. 3b illustrates a desired velocity change vector 310, and 312 represents the velocity change error attributable to an attitude transient; the sum or resultant vector is illustrated as 314, which deviates from the desired vector 310. If the desired velocity change were greater than 310, as for example the sum of vectors 310 plus 316, the magnitude of the attitude transient would be the same, namely 312. The resultant of vectors 310, 312, and 316 is vector 318 of FIG. 3b. Comparison of the direction of vector 314 with vector 318 shows that vector 318 is closer in direction to desired direction 310, 316 than is vector 314. This means that the proportion of velocity change error is greater in the case of short thruster firings or burns than in the case of long thruster burns.

Returning once again to consideration of FIG. 2, a delta-V or ΔV targeting controller illustrated as 228 receives inertial quaternions from Attitude Determination logic block 216 by way of a signal path 232. These quaternions represent the transformation from inertial to body coordinates as determined using sensors 212 and 214, and by the processing provided by logic block 216. Controller 228 also receives, by way of a signal path 230, information relating to the desired direction or orientation of the velocity change thruster (LAE) thrust axis. The information relating to the LAE thruster axis may be uplinked to the spacecraft prior to the velocity change maneuver, and is held in temporary storage until needed by controller 228. Controller 228 processes the information to produce a second torque demand signal on signal path 236 for application to a second non-inverting input port of summer 222, which sums the two torque demand signals to generate gain-controlled summed torque demand signals. In general, controller 228 determines a quantity proportional to the integrated component of the LAE thrust which is perpendicular or orthogonal, in inertial space, to the desired thrust direction, and then transforms the data to the body frame. As mentioned above, the body frame may be rotating slowly in the inertial coordinate system. The integrated pointing error is assumed to represent the delta-V error at right angles to the desired delta-V direction. The processing can be understood by imagining small discrete time intervals. Thus, at the first instant of burn of the LAE, there is no error, because the unwanted torque has not rotated the spacecraft away from the desired pointing direction. During the second instant, the pointing direction is slightly off the desired direction, and a small first component of the thrust occurs in the undesired direction. During the third instant, the angular error increases, so a larger second component of velocity change occurs in the wrong direction, and this larger second component is summed with the first smaller component. During each successive instant until the attitude error is corrected, the thrust direction pointing errors are accumulated, to form a signal representing the total magnitude of the velocity change (312 of FIG. 3b) in the wrong direction. The integral representing the cumulated velocity-change error is transformed to the body frame, and is processed to produce a torque demand signal.

Figure 4:
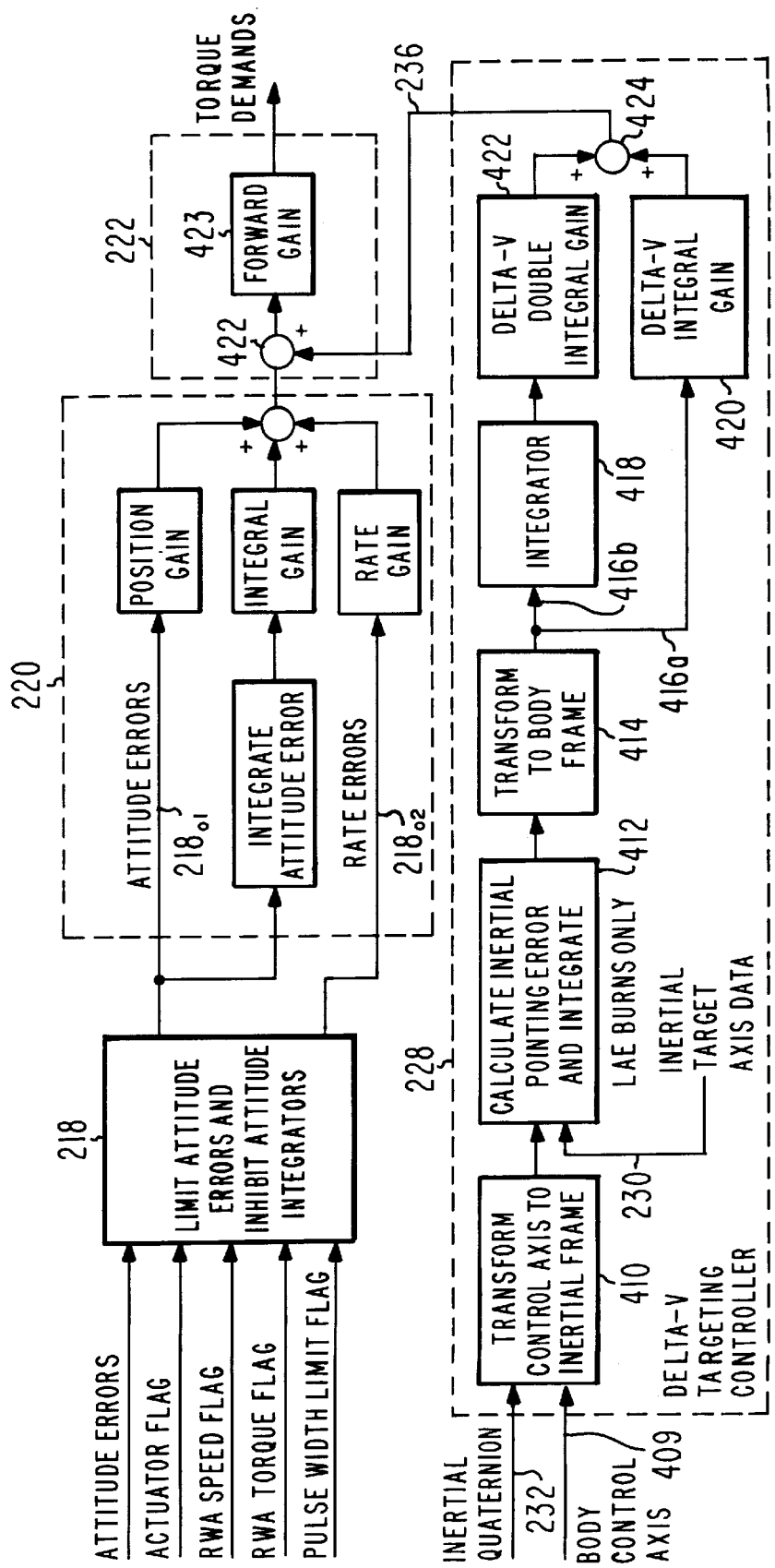
FIG. 4 is a simplified block diagram of a portion of the controller of FIG. 2.

FIG. 4 is a more detailed block diagram of the orbit adjust logic 218, PID controller 220, summer 222, and delta-V targeting controller 228 of FIG. 2. In FIG. 4, the inertial quaternions, representing the transformation of the sensed spacecraft attitude from inertial coordinates to the slowly rotating body frame, are applied by way of signal path 232 to a logic block 410. The coordinates of the thrust axis in the spacecraft body frame (a fixed value determined by the alignment of the nominal LAE thrust axis with the spacecraft body frame at the time of assembly of the spacecraft)

are applied over a signal path 409 to a logic block 410; this information may be stored in an on-board memory, or uploaded from a ground station when needed. The body control or thrust axis orientation information is transformed to the inertial frame in block 410. Logic block 410 represents transformation of the nominal thrust axis of the velocity change thruster, which is to be aligned with the desired direction of delta-V, to the inertial frame, to thereby remove the effect of the rotation of the spacecraft, so that the pointing error between the body control axis and the target vector in the inertial frame can be determined. The transformed signals from block 410 are applied to a block 412, together with inertial target axis (desired delta-V axis) data applied over a path 411. In the absence of pointing errors, this thrust axis is directed along an inertial target axis. Block 412 represents determination of the instantaneous inertial pointing error, (corresponding to the instantaneous attitude or pointing error of plot 30 of FIG. 3a), and the integration of the instantaneous pointing error, to thereby form a signal representing the delta-V direction error in inertial coordinates. The integrated delta-V direction-error-representative signal is applied to a further block 414, which represents transformation of the information to the body frame, so that subsequent actions can be performed with reference to the spacecraft. The resulting body-frame signals are applied over a signal path 416a to a gain block 420 and over a path 416b to a further integrator illustrated as a block 418. Block 420 multiplies the signal passing therethrough by a constant gain function. Since the gain function of block 420 is applied to the integrated delta-V signal originally generated in block 414, block 420 is termed "delta-V integral gain." Integrator 418 integrates the integrated, transformed delta-V direction error signal a second time, to generate signals representative of the double integral of the delta-V direction error signal. Block 422 represents a gain block for the double-integrated delta-V error signal. The gain-adjusted integrated and double-integrated delta-V error signals are summed in a summing circuit 424, and the sum represents a torque demand signal which is applied over signal path 236 to summer 222. The integrated signal component from block 420 controls, or "provides" torque proportional to the magnitude of the delta-V error, and the double-integral component from block 422 tends to produce a torque which slews the spacecraft body in a manner which rotates the spacecraft body in a manner which nulls any slight remnant of delta-V direction error.

As illustrated, summer 222 includes a summing circuit 422 which sums the attitude control torque demand signals from PID controller 220 with the delta-V control torque demand signals from summing circuit 424, to produce summed torque demand signals. The summed torque demand signals from summing circuit 422 are multiplied by a forward gain function represented by a block 423, to produce the gain-controlled torque demand signals at the output of summer 222. The torque demand signals at the output of summer 222, in turn, are applied to control the torquers 20 of the spacecraft as described above, to correct the attitude to tend to null the delta-V error.

Figure 5:
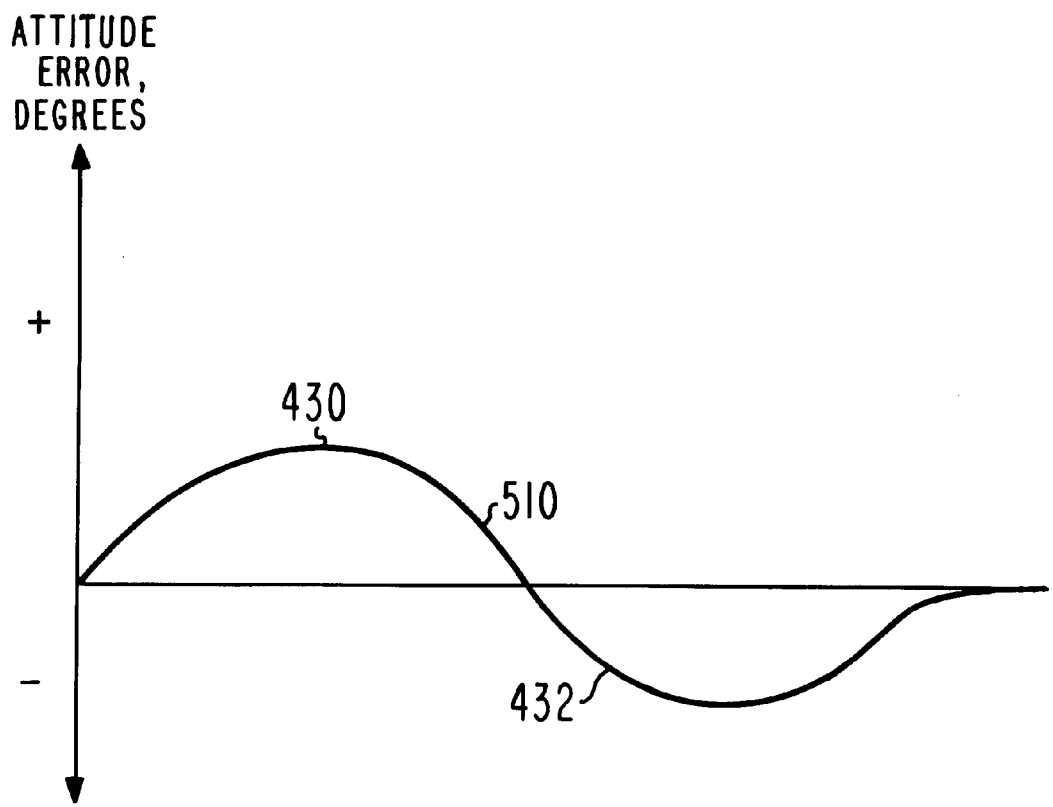
FIG. 5 is a conceptual plot of attitude errors resulting from operation in accordance with the invention.

FIG. 5 illustrates a conceptual plot 510 which represents the attitude errors resulting from a spacecraft according to the invention. In FIG. 5, plot 510 includes a first portion 430 in a first direction, which represents the pointing error due to the delay of the attitude control system, as in plot 30 of FIG. 3a. Plot 510 also includes a second portion 432, which deviates from the desired attitude due to the action of the delta-V targeting controller 228 interacting with the thruster controller. The magnitude of the area under the curve of portion 432 is similar to the area under the curve 430, to tend to produce about the same delta-V in a second direction, opposite to the first direction, to thereby tend to cancel the delta-V error.

The errors in pointing referred to above occur only when a velocity change thruster is energized, and the error in the direction of the delta-V occurs only during the period in which the thruster is energized while pointed in an incorrect direction. Thus, the errors described herein are associated only with operation of one or more velocity change thrusters. Consequently, there is no need for the corrections described in conjunction with blocks 222 and 228 unless a velocity change thruster is operating. The entire block 228 can therefore be rendered inoperative during intervals in which the thruster is inoperative, so as not to generate any unwanted signals which might perturb ordinary operation of the attitude control system. For this purpose, path 236 may be opened, if desired, by a switch illustrated as 260, during nonoperation of the delta-V thruster, to guarantee that incidental or stray signals are not added to the attitude control torque demand signals in summer 222.

Thus, a method for operating a spacecraft defining a center of mass includes the step of continuously operating the spacecraft in a three-axis stabilized mode. Operation in the three-axis stabilized mode is accomplished by determining the attitude of the spacecraft, and comparing the attitude of the spacecraft with a desired attitude, to thereby generate attitude and attitude rate error signals. The attitude and rate error signals are operated on with at least one of proportional, integral, and derivative characteristics, to thereby form a first torque demand signal for aiding in attitude control, to tend to maintain the desired attitude. A desired velocity-change direction is selected. That attitude is selected which orients the spacecraft so that the nominal thrust axis of a velocity change thruster is aligned with the desired velocity-change direction. A velocity change thruster is operated for a period of time in order to achieve the desired nominal magnitude of velocity change in the desired direction. Unavoidable misalignments between the nominal thrust axis and the center of mass cause an undesired residual torque, which tends to cause the direction of the velocity change imparted by the thruster to progressively diverge from the desired velocity-change direction, until such time at which the operation of the attitude control returns the attitude of the spacecraft to its nominal attitude. As a result of the transient attitude error before the attitude control returns the attitude to the desired attitude, a component of the velocity change occurs in a direction other than, or orthogonal to, the desired direction. The integrated effect of having a thrust direction component that is perpendicular to the desired inertial delta-V direction is determined, to produce a second error signal. A second torque demand signal is generated from the second error signal. During the operation of the velocity-change thruster, the first and second torque demand signals are summed to form a summed torque demand signal for controlling the attitude control thrusters. In a particular embodiment, the step of generating the second error signal includes the step of integrating, over a time interval, the spacecraft pointing error in an inertial coordinate frame.

A spacecraft (10) according to the invention includes an attitude sensing arrangement (212, 214) for sensing the attitude of the spacecraft body (12) in space, and for generating attitude-representative signals in response thereto. An attitude control arrangement (216, 218) is coupled to the attitude sensing arrangement (212, 214), for comparing the attitude-representative signals with signals representing a desired attitude, and for generating at least attitude error signals from the comparison. A loop control processing arrangement (220) is coupled to the attitude control arrangement (216, 218), for processing the attitude error signals with at least one of a proportional, integral, and derivative transfer characteristic, as required for loop stability, to thereby generate first torque demand signals. A velocity-change thruster (22) is oriented with its nominal thrust axis (23) aligned with the nominal center of mass (CM) of the spacecraft body (12), to reduce unwanted torques. Operation of the velocity-change thruster (22) tends to accelerate the spacecraft (10) in the direction of the nominal thrust axis (23), but unavoidable misalignments between the nominal thrust axis (23) and the center of mass (CM) of the spacecraft (10) tend to cause unwanted residual torque. The unwanted residual torque causes the actual direction of the velocity change to deviate from the desired velocity change direction. A thrust direction determining arrangement (212, 214, 216) determines the actual direction of the velocity change of the spacecraft when the velocity-change thruster is energized, and generates actual delta-V direction representative signals, because the body attitude is a moment-to-moment indication of the orientation of the thrust axis in the body frame or coordinate system. The signals representing moment-to-moment orientation of the thrust axis are transformed from the body frame to inertial coordinates in block 410. A velocity-change targeting control arrangement (412, 414, 416 a & b, 418, 420, 422, 424) is coupled to the thrust direction determining arrangement (212, 214, 410), for comparing (412) the actual direction of the thrust axis or acceleration in inertial coordinates with the desired direction of the thrust axis, also in inertial coordinates, and for integrating to find a quantity that is representative of the total or accumulated velocity change error, for transforming (414) the direction error signal to the body frame, and (418, 420, 422, 424) for generating second torque demand signals. An attitude control torquer arrangement (20) is coupled to the body (12) of the spacecraft (10), for generating attitude control torques in response to sum torque demand signals. A summing arrangement (222) is coupled to the loop control arrangement (218) and to the velocity-change targeting control arrangement (228), for summing the first and second torque demand signals to produce the sum torque demand signals. In a particular embodiment of the invention, the summing arrangement (222) includes switching means (236) which allows the first and second torque demand signals to be summed only during those intervals in which the velocity-change thruster is energized. The loop control processing arrangement (218) may include a PID processor. The torquers may be momentum or attitude control wheels, magnetic torquers or thrusters.

Other embodiments of the invention will be apparent to those skilled in the art. For example, the sensors and controllers may be either digital or analog, as required, and when the signals are digital, the signal paths may be parallel or serial, all as known in the art. While the description of the operation of the system according to the invention has been couched in terms of two dimensions, those skilled in the art will understand that three-dimensional calculations and actions are meant. While the processing of signals has been described as associated with "blocks," it will be understood that this is merely a conventional way to conceptually describe the operation, and should not be taken as being representative of the actual construction of the spacecraft or of its controllers; at the present state of the art, the described functions are ordinarily performed by software in conjunction with one or more general-purpose computers. While the torque modulation is often accomplished by pulse-width or pulse-duration modulation of the ON-times of the selected thrusters, as described, other torque thruster modulation techniques may be used, as for example by modulation of the electrical energy applied to an arcject.

What is claimed is:

1. A method for operating a spacecraft defining a center of mass, comprising the steps of:

continuously operating said spacecraft in a three-axis stabilized mode by determining the attitude of said spacecraft, comparing said attitude of said spacecraft with a desired attitude to generate attitude and attitude rate error signals, and operating on said attitude and rate error signals with a proportional-integral-derivative characteristic, to thereby form a first torque demand signal for aiding in attitude control, to tend to maintain said desired attitude;

selecting a desired velocity-change direction;

selecting said desired attitude for orienting said spacecraft so that the nominal thrust axis of a velocity change thruster is aligned with said desired velocity-change direction;

operating said velocity-change thruster for a period of time in order to achieve the desired nominal magnitude of velocity change in said desired direction, whereby unavoidable misalignments between said nominal thrust axis and said center of mass cause an undesired residual torque, which residual torque tends to cause the direction of said velocity change to progressively diverge from said desired velocity-change direction until such time at which said step of continuously operating returns said attitude of said spacecraft to its nominal attitude, whereby a component of said velocity change occurs in a direction other than said desired direction during that interval before said attitude returns to said nominal attitude;

determining the direction, in inertial coordinates, of the nominal thrust axis of said velocity change thruster;

comparing said direction of said thrust axis in inertial coordinates with said direction of said desired velocity change, to produce a second error signal representative of the error between said desired velocity change direction and said thrust axis direction, and for producing a second torque demand signal in response to said second error signal; and during said operation of said velocity-change thruster, summing said first and second torque demand signals to form a summed torque demand signal for controlling said attitude control thrusters.

2. A method according to claim 1, wherein said step of comparing said thrust axis direction with said direction of said desired velocity includes the steps of:

determining the difference between said direction of said direction of said thrust axis and said desired velocity change to generate a pointing error; and integrating said pointing error over a time interval.

3. A spacecraft, comprising:

attitude sensing means for sensing the attitude of said body in space, and for generating attitude-representative signals in response thereto;

attitude control means coupled to said attitude sensing means, for comparing said attitude-representative signals with signals representing a desired attitude, and for generating at least attitude error signals from said comparison;

loop control processing means coupled to said attitude control means, for processing said attitude error signals with at least one of a proportional, integral, and derivative transfer characteristic, as required for loop stability, to thereby generate first torque demand signals;

a velocity-change thruster oriented with its nominal thrust axis aligned with the nominal center of mass of said spacecraft, whereby operation of said velocity-change thruster tends to accelerate said spacecraft in the direction of said nominal thrust axis, but unavoidable misalignments between said nominal thrust axis and said center of mass of said spacecraft tend to cause a residual torque which causes the actual direction of said velocity change to deviate from said desired velocity change direction;

thrust direction determining means for determining the actual direction of said thrust axis of said spacecraft when said velocity-change thruster is energized, to thereby generate actual thrust axis direction representative signals;

velocity-change targeting control means coupled to said thrust direction determining means, for comparing said actual direction of said thrust axis with said desired direction of said velocity change, for generating second torque demand signals;

attitude control thruster means for generating attitude control torques in response to sum torque demand signals; and summing means coupled to said loop control means and to said velocity-change targeting control means, for summing said first and second torque demand signals to produce said sum torque demand signals.

4. A spacecraft according to claim 3, wherein said summing means is for summing said first and second torque demand signals only during those intervals in which said velocity-change thruster is energized.

5. A spacecraft according to claim 3, wherein said loop control processing means comprises PID processing means.

6. A spacecraft according to claim 3, wherein said velocity-change targeting control means comprises:

error determining and integrating means coupled to receive information relating to said desired direction of said velocity change, and coupled to said thrust direction determining means, for comparing said actual direction of said thrust axis with said desired direction of said velocity change, for forming an error signal, and for integrating said error signal to produce inertial-frame torque demand signals;

transformation means coupled to said error determining and integrating means, for converting said inertial-frame torque demand signals to body frame torque demand signals; and gain means coupled to said transformation means, for applying a gain function to said inertial-frame torque demand signals, to thereby generate at least a component of said second torque demand signals.

7. A spacecraft according to claim 3, wherein said velocity-change targeting control means comprises:

error determining and integrating means coupled to receive information relating to said desired direction of said velocity change, and coupled to said thrust direction determining means, for comparing said actual direction of said thrust axis with said desired direction of said velocity change, for forming an error signal, and for integrating said error signal to produce inertial-frame torque demand signals;

transformation means coupled to said error determining and integrating means, for converting said inertial-frame torque demand signals to body frame torque demand signals;

gain means coupled to said transformation means, for applying a gain function to said inertial-frame torque demand signals, to thereby generate at least one component of said second torque demand signals;

second integrating means coupled to said transformation means, for integrating said inertial-frame torque demand signals, to thereby generate at least another component of said second torque demand signals; and adding means coupled to said gain means and to said second integrating means, for adding together said one component and said further component of said second torque demand signals.

* * * * *